Patented Apr. 27, 1926.

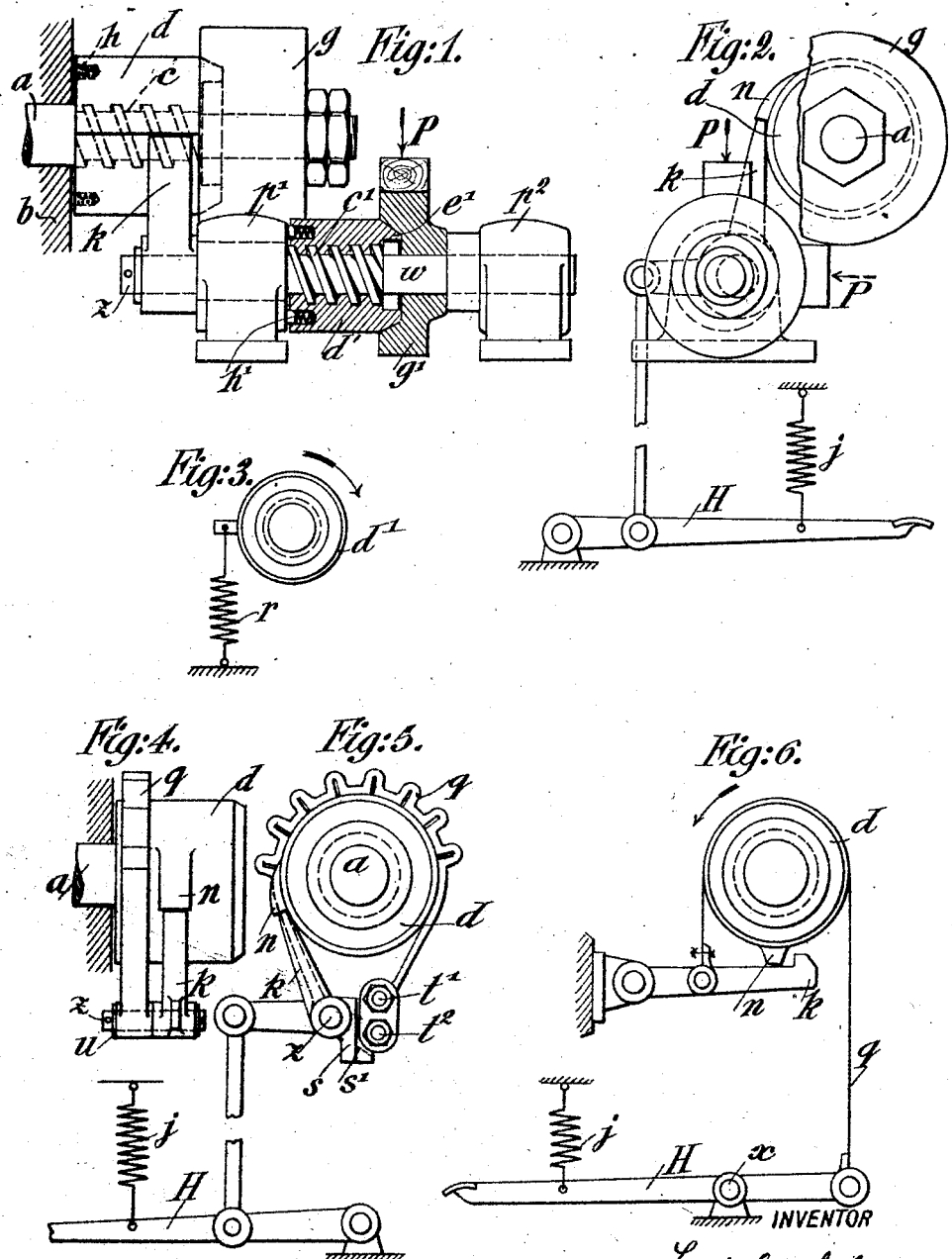

1,582,311

UNITED STATES PATENT OFFICE.

LEOPOLD SCHULL, OF VIENNA, AUSTRIA.

PINCHING CLUTCH FOR ECCENTRIC PRESSES AND SHEARS.

Application filed December 11, 1920. Serial No. 430,072.

*To all whom it may concern:*

Be it known that I, LEOPOLD SCHULL, citizen of the Republic of Austria, and resident of 107 Dresdnerstrasse, XX, Vienna, in the Province of Lower Austria and Republic of Austria, have invented certain new and useful Improvements in Pinching Clutches for Eccentric Presses and Shears, of which the following is a specification.

It has been already proposed, to employ pinching-clutches for driving eccentric presses and shears. Such clutches consist preferably of two parts. One of them, namely the coupling box is provided with an internal screw thread and its shaft has a corresponding threaded portion. The second part of the clutch is formed as a driving pulley being loosely mounted on the shaft. Both of these coupling members are provided with friction surfaces pressed against each other by a suitable force.

In order to disengage the clutch it is sufficient to quickly prevent the revolution of the coupling box by moving a pawl so that it comes into the path of a tooth provided on the coupling box. If the clutch is disengaged in this manner, then because of the high kinetic energy of the coupling box an excessive strain on the pawl is caused so that the diameter of it must be made very strong and large. As bolts of such great size are bent very little excessive strains are caused.

According to the present invention these disadvantages are avoided in that the locking members are formed or mounted in such a manner that a resistance is produced by which the kinetic energy of the box is gradually lessened so as to prevent excessive strain on the locking members and their bearings.

Fig. 1 is a front elevation partially in section illustrating an embodiment of my invention. The lower part of the driving pulley has been omitted to more clearly illustrate the other parts.

Fig. 2 is an end view of Fig. 1.

Fig. 3 is a detail view.

Fig. 4 is a front elevation of another embodiment of my invention.

Fig. 5 is an end view of Fig. 4.

Fig. 6 is an elevation illustrating a third embodiment of my invention.

The first embodiment of my invention is illustrated in Figs. 1, 2 and 3. The pawl $k$ is rotatably mounted on the eccentric end journal $z$ of an auxiliary shaft $w$ which is supported in the bearings $p_1$ and $p_2$ and provided with a self locking screw-thread $c_1$.

This screw-thread engages with the corresponding internal screw-thread of the coupling box $d_1$. The end of this coupling box is shaped so as to have a conical friction surface $e_1$ engaging with the conical recess of the brake pulley $g_1$ which is rotatably mounted on the shaft $w$ and can be braked by means of the brake-shoe P with a definite pressure. The box $d_1$ is pressed against the brake pulley $g_1$ by spring-actuated pins $h_1$. When the pawl $k$ is turned into the path of the tooth $n$ the impact causes a slight revolution of the shaft $w$ and hence, by means of the box $d_1$ also of the brake-pulley $g_1$. By this braking device the kinetic energy of the box $d_1$ is destroyed along a distance increasing and decreasing according to the brake pressure.

The disengagement of the coupling is effected by a spring $r$ acting as shown in Fig. 3 on the box $d_1$.

The modification illustrated in Figs. 4 and 5 embodies a brakeband $q$. One end of this band is secured by the screw-bolts $t_1$ and $t_2$ to the standard of the machine. The other end is connected with the journal $z$ of the pawl $k$ and secured by a washer $u$. The hub of the pawl $k$ forms a slide $s$ guided by the short guide $S_1$, which is fixed on the standard by means of screws $t_1$ and $t_2$.

The brake band is formed with projections or teeth on its circumference as shown in Fig. 5 so that it can bend and simultaneously produce a powerful friction-pressure between itself and the brake-pulley i. e. the box $d$.

When the tooth $n$ strikes against the pawl $k$ the latter slides downwardly with the journal $z$ thus stretching the brake band $q$ and destroying the kinetic energy of the box along a certain distance according to the pressure applied to the brake band.

Fig. 6 illustrates the application of a brake band $q$ controlled by the locking members themselves. This brake band is wound around the box $d$ and secured at its right end on the double-armed foot lever H the latter being mounted on the axle $x$ and subjected to the action of a spring $j$. The left end of this brake band is connected with the pawl $k$. When the lever H is pressed down the spring $j$ is put under tension and the brake band is released so that the pawl $k$ is turned out of the path of the tooth $n$ by means of its own weight.

When the lever H is released, the pawl $k$ is caused to move into the path of the tooth $n$ by the action of the spring $j$ and the brake band $q$. The impact of the tooth $n$ against the pawl $k$ causes the pawl to be pushed downwardly so that the brake band has its tension increased, and this destroys the kinetic energy of the box $d$. The construction shown in Fig. 6 is intended to illustrate the braking effect which can be produced by the turning of pawl $k$, and the auxiliary parts not shown in Fig. 6 may be constructed as heretofore set forth. The movement of the pawl $k$ into or out of the path of movement of the tooth $n$ is regulated by the actuation of a foot treadle H and to which the tension spring $j$ is secured.

If desired the tooth $n$ can be made of any suitable bendable material.

Wherever I refer to any of the parts herein described, by reference letter, either in the description or in the claims, I do not wish to be limited to the form or forms thereof herein illustrated.

Without limiting myself to the exact construction and arrangement of parts herein shown and described, what I claim, and desire to secure by Letters Patent, is:

1. In a drive for an eccentric press or the like, the combination of a revoluble drive shaft, a driving pulley adapted to be revolved independently of said drive shaft and to be also revolved in unison with said drive shaft, said drive shaft having a portion thereof externally threaded, an internally threaded coupling box mounted on the externally threaded portion of said drive shaft, said coupling box having a portion thereof adapted to frictionally engage said driving pulley, spring means adapted to actuate said coupling box so that it normally is in frictional engagement with said driving pulley, a pawl movable toward and away from said coupling box and adapted to engage said coupling box and hinder the revolution thereof, and independent braking means adapted to be set into operation by the actuation of said pawl when it is engaged with said coupling box.

2. A structure according to claim 1 in which the said pawl is mounted on a shaft, the movement of the said shaft being adapted to cause the movement of said braking means to a position in which it exerts a greater frictional effect.

Signed at Vienna, Austria, 16 November, A. D. 1920.

LEOPOLD SCHULL.